(12) United States Patent
Glickman et al.

(10) Patent No.: US 11,643,044 B2
(45) Date of Patent: May 9, 2023

(54) ACTIVE GRILLE SHUTTER WITH PEDESTRIAN PROTECTION

(71) Applicant: Ford Global Technologies, LLC, Dearborn, MI (US)

(72) Inventors: David Brian Glickman, Southfield, MI (US); Sean Terence Coghlan, Canton, MI (US); Darshan Arun Nayak, Northville, MI (US); James Alan Acre, Monroe, MI (US); Aaron Peter Klop, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 79 days.

(21) Appl. No.: 17/167,346

(22) Filed: Feb. 4, 2021

(65) Prior Publication Data

US 2022/0242360 A1    Aug. 4, 2022

(51) Int. Cl.
*B60R 21/34* (2011.01)
*B62D 65/16* (2006.01)
*B62D 21/15* (2006.01)
*B60K 11/08* (2006.01)

(52) U.S. Cl.
CPC ............ *B60R 21/34* (2013.01); *B60K 11/085* (2013.01); *B62D 21/155* (2013.01); *B62D 65/16* (2013.01)

(58) Field of Classification Search
CPC ......... B60R 21/00; B60R 21/34; B60R 19/02; B62D 65/16; B62D 21/155; B60K 11/085
USPC ....................................................... 180/271
See application file for complete search history.

(56) References Cited

U.S. PATENT DOCUMENTS

| 7,097,222 | B2 * | 8/2006 | Ran .................. B60R 19/28 293/137 |
| 9,150,096 | B2 * | 10/2015 | Takanaga ............... B60R 19/52 |
| 9,315,168 | B2 * | 4/2016 | Pugh-Jones ............ B60R 19/52 |
| 9,475,441 | B2 | 10/2016 | Calleja et al. |
| 10,525,918 | B2 | 1/2020 | Naderer et al. |
| 2013/0092463 | A1 * | 4/2013 | Hori ..................... B60K 11/085 180/68.1 |
| 2013/0223980 | A1 * | 8/2013 | Pastrick .................. F01D 5/00 415/1 |

(Continued)

FOREIGN PATENT DOCUMENTS

| CN | 110641403 A | 1/2020 | |
| CN | 113939431 A * | 1/2022 | ............ B60R 19/18 |

(Continued)

*Primary Examiner* — Amy R Weisberg
*Assistant Examiner* — Caitlin Anne Miller
(74) *Attorney, Agent, or Firm* — Vichit Chea; Carlson, Gaskey & Olds, P.C.

(57) ABSTRACT

A grille assembly for a vehicle is disclosed and includes a forward frame portion, an aft frame portion, and a plurality of spring portions coupling the forward frame portion to the aft frame portion such that the forward frame is movable relative to the aft frame portion. A front end assembly for a vehicle is also disclosed that includes a bolster assembly and an active grille shutter system supported relative to the bolster assembly. The disclosed active grille shutter system includes a plurality of spring portions coupling forward and aft frame portions such that the forward frame is movable relative to the aft frame. Vanes are supported by at least one of the forward and aft frame portions and are rotatable for controlling airflow.

17 Claims, 5 Drawing Sheets

(56) References Cited

U.S. PATENT DOCUMENTS

| | | | | |
|---|---|---|---|---|
| 2014/0175815 A1* | 6/2014 | Kim | ............... | B60R 19/52 |
| | | | | 293/115 |
| 2018/0134247 A1* | 5/2018 | Pingston | ............... | B60R 19/52 |
| 2018/0208049 A1* | 7/2018 | Klop | ............... | B60R 19/52 |

FOREIGN PATENT DOCUMENTS

| | | | |
|---|---|---|---|
| JP | 2008174018 A | | 7/2008 |
| JP | 2014198509 A | | 10/2014 |
| WO | WO-2021170926 A1 | * | 9/2021 |

\* cited by examiner

United States Patent US 11,643,044 B2

ACTIVE GRILLE SHUTTER WITH PEDESTRIAN PROTECTION

TECHNICAL FIELD

This disclosure relates to a front end structure for a motor vehicle including an active grille shutter system with pedestrian protection features.

BACKGROUND

An active grille shutter is a component of a vehicle front architecture that controls an amount of airflow through a radiator and other heat exchangers to improve vehicle performance. The front area of a vehicle is subject to pedestrian protection requirements.

SUMMARY

A grille assembly for a vehicle according to a disclosed example embodiment includes, among other possible things, a forward frame portion, an aft frame portion, and a plurality of spring portions coupling the forward frame portion to the aft frame portion such that the forward frame is movable relative to the aft frame.

In a further embodiment of the foregoing grille assembly for a vehicle, a plurality of vanes are supported by at least one of the forward frame portion and the aft frame portion, wherein each of the plurality of vanes are rotatable for controlling airflow.

In a further embodiment of any of the foregoing grille assemblies for a vehicle, an actuator coupled to the plurality of vanes with flexible arms movable by the actuator and flexible to provide for movement forward frame portion relative to the aft frame portion.

In a further embodiment of any of the foregoing grille assemblies for a vehicle, the forward frame portion and the aft frame portion define an outer perimeter and the plurality of vanes are disposed horizontally within the outer perimeter.

In a further embodiment of any of the foregoing grille assemblies for a vehicle, the forward frame portion and the aft frame portion are nested within each other.

In a further embodiment of any of the foregoing grille assemblies for a vehicle, the aft frame is fixed relative to the forward frame.

In a further embodiment of any of the foregoing grille assemblies for a vehicle, each of the plurality of spring portions include a forward spring portion attached to the forward frame portion, an aft spring portion attached to the aft frame portion and a middle spring portion connecting the forward spring portion to the aft spring portion.

In a further embodiment of any of the foregoing grille assemblies for a vehicle, the forward spring portion and the aft spring portion are disposed within a common plane and the middle portion is spaced apart from the common plane such that the forward spring portion is collapsible against the aft spring portion.

In a further embodiment of any of the foregoing grille assemblies for a vehicle, each of the forward spring portion, middle spring portion and aft spring portion include a common thickness in a direction transverse to a longitudinal length, the common thickness defining a spring rate of each of the plurality of spring portions.

In a further embodiment of any of the foregoing grille assemblies for a vehicle, each of the forward spring portion, the middle spring portion and the aft spring portion comprise equal longitudinal lengths.

In a further embodiment of any of the foregoing grille assemblies for a vehicle, at least two of the forward spring portion, the middle spring portion and the aft spring portion comprise different longitudinal lengths.

A front end assembly for a vehicle according to exemplary embodiment of this disclosure includes, among other possible things, a bolster assembly and an active grille shutter system supported relative to the bolster assembly, the active grille shutter system including a forward frame portion, an aft frame portion, a plurality of spring portions coupling the forward frame portion to the aft frame portion such that the forward frame is movable relative to the aft frame, and a plurality of vanes supported by at least one of the forward frame portion and the aft frame portion, wherein each of the plurality of vanes is rotatable for controlling airflow.

In a further embodiment of the foregoing front end assembly for a vehicle, the active grille shutter assembly comprises an upper active grille shutter assembly and a lower active grille shutter assembly.

In a further embodiment of any of the foregoing front end assemblies for a vehicle, each of the plurality of spring portions include a forward spring portion attached to the forward frame portion, an aft spring portion attached to the aft frame portion and a middle spring portion connecting the forward spring portion to the aft spring portion.

In a further embodiment of any of the foregoing front end assemblies for a vehicle, the forward frame portion and the aft frame portion are nested within each other.

A method of assembling an active grille shutter system according to another embodiment of this disclosure, among other possible things, includes forming a forward grille portion and an aft grille portion coupled together with a plurality of spring portions as a single part, forming a plurality of vanes, and attaching the plurality of vanes to one of the forward grille portion and the aft grille portion.

A further embodiment of the foregoing method further comprises mounting an actuator to a static structure and attaching flexible arms of the actuator to the plurality of vanes.

A further embodiment of any of the foregoing methods includes forming the forward grille portion to nest within the aft grille portion in response to application of force on the aft grille portion.

A further embodiment of any of the foregoing methods includes forming the plurality of spring portions to provide a predefined spring rate between the forward grille portion and the aft grille portion.

A further embodiment of any of the foregoing methods includes forming the plurality of spring portions to nest against each other in a compressed condition, wherein the compressed condition comprises the forward grille portion nested within the aft grille portion.

The various features and advantages of this disclosure will become apparent to those skilled in the art from the following detailed description. The drawings that accompany the detailed description can be briefly described as follows.

DETAILED DESCRIPTION

Figure 1:
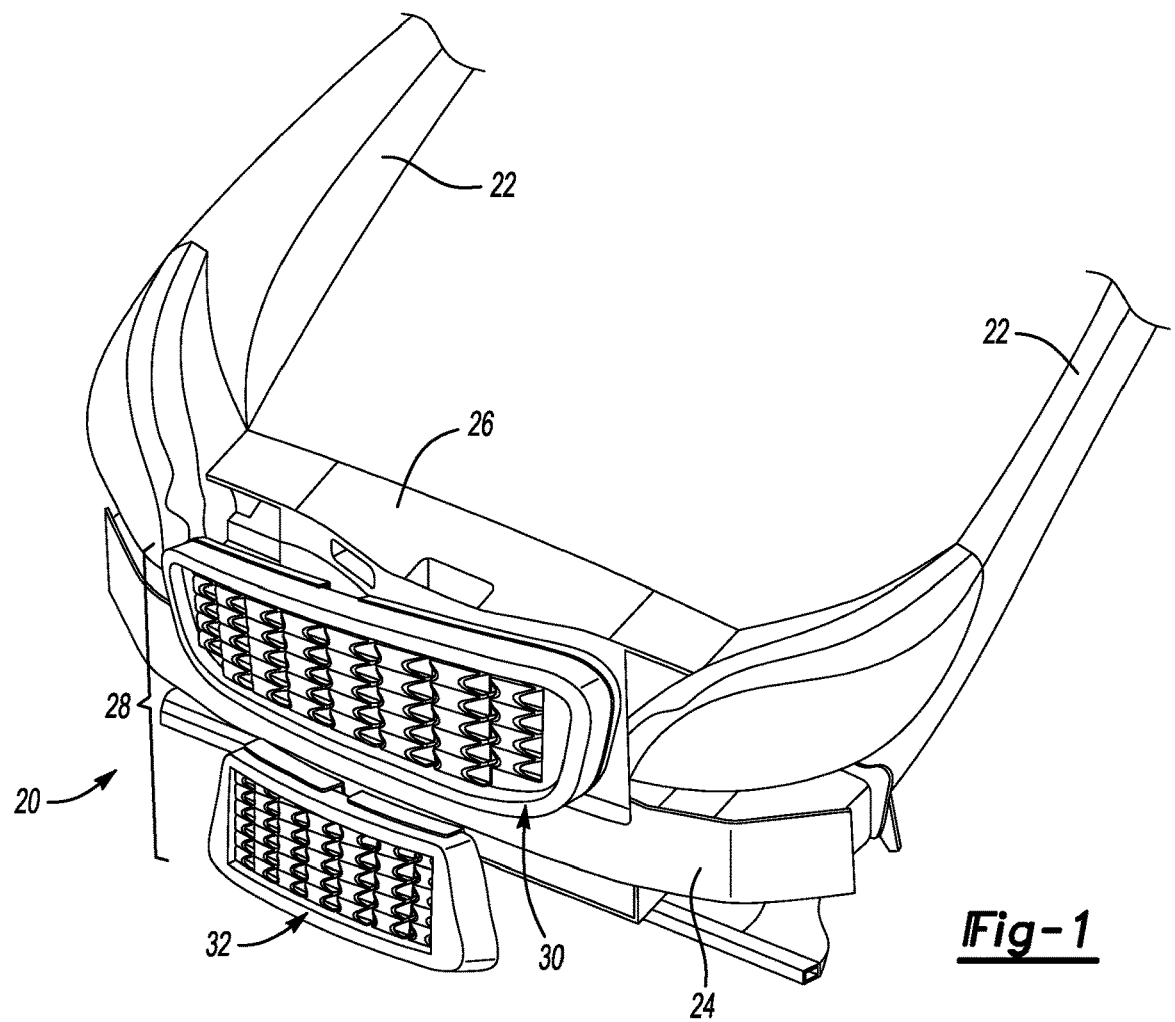
FIG. 1 is a perspective view of an example front end structure of a motor vehicle.

Referring to FIG. 1, an example front end assembly 20 for a vehicle is shown and includes frame members 22 supporting a bolster 24 and a radiator 26. An active grille shutter system 28 is mounted forward of the radiator 26 to control airflow through the radiator 26. Controlling airflow through the radiator 26 provides for an engine to reach desired operating temperatures quickly to improve operating efficiencies.

The front end assembly 20 provides pedestrian protection features to reduce potential damage possible resulting from an impact with the vehicle. The active grille shutter system 28 is within an area that provides strike zone protection. The example active grille shutter system 28 includes features that absorb impact energy.

The example active grill shutter system 28 includes an upper grille assembly 30 disposed above the bolster 24 and a lower grille assembly 32 disposed below the bolster 24. The upper grille assembly 30 controls airflow through the radiator 26 and the lower grille assembly 32 controls airflow through other heat exchangers within the vehicle.

Figure 2:
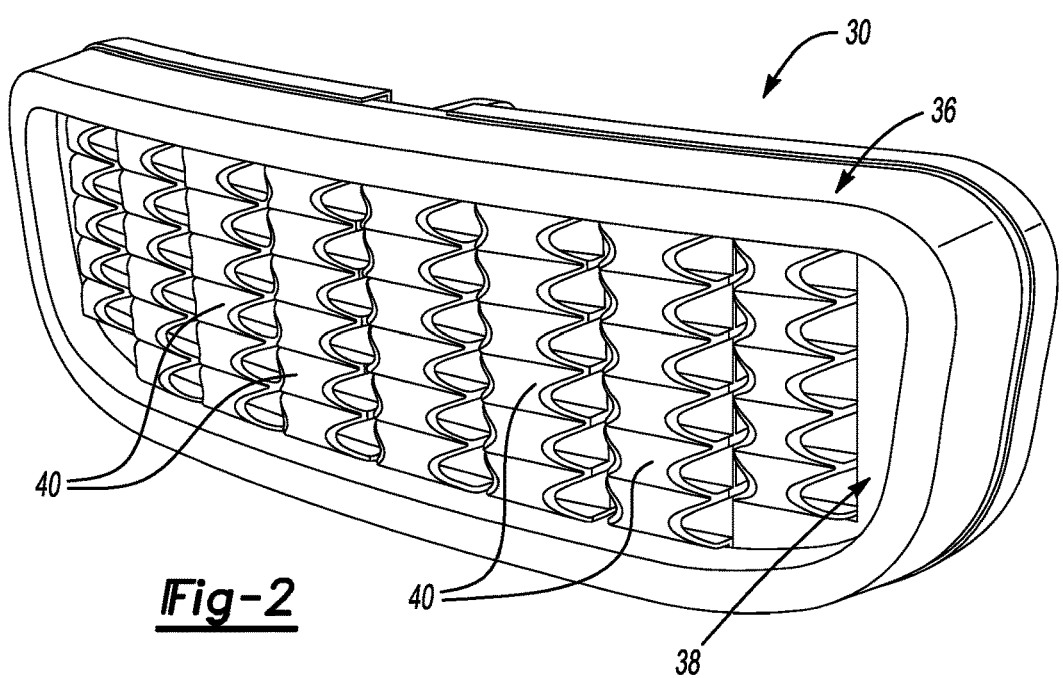
FIG. 2 is a perspective view of a front side of an example active grille shutter system.
Figure 3:
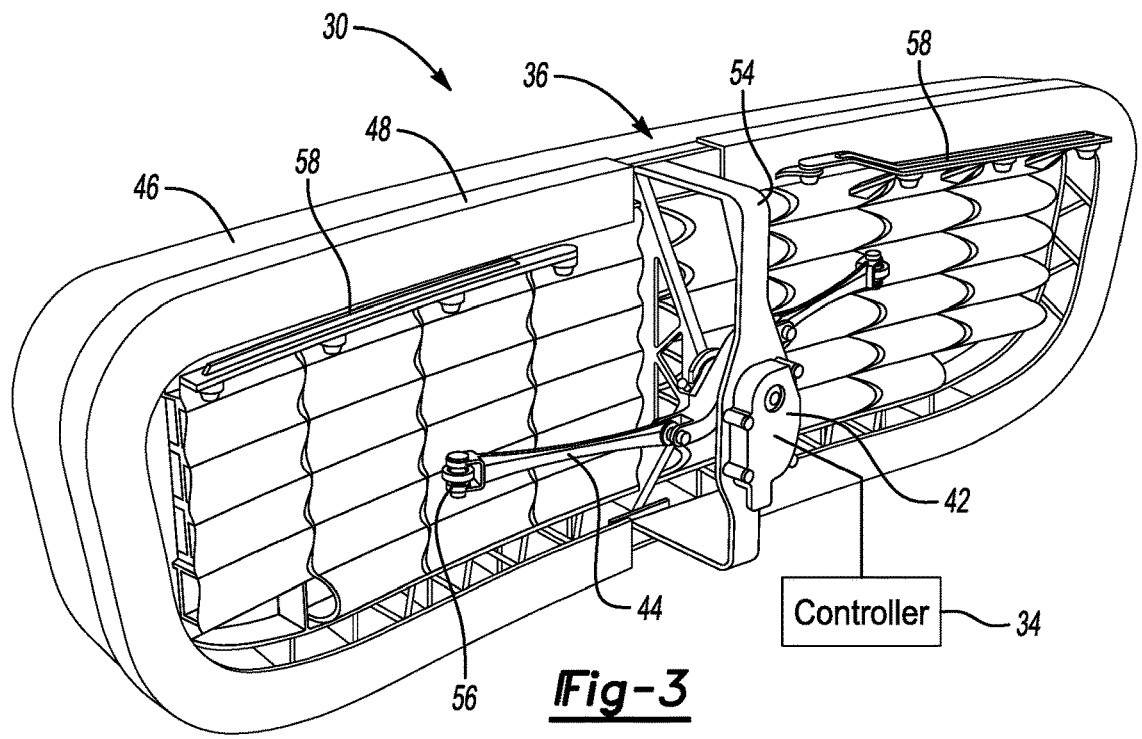
FIG. 3 is a perspective view of a back side of the example active grille shutter system.

Referring to FIGS. 2 and 3 with continued reference to FIG. 1, the example upper grille assembly 30 is shown and described by way of example. The lower grille assembly 32 also includes features disclosed by way of the upper grille assembly 30. The upper grille assembly 30 includes a frame 36 that defines an outer periphery 38. The frame 36 supports a plurality of rotatable vanes 40 driven by an actuator 42. The actuator 42 drives flexible arms 44 that are connected at a pivotal connection 56 to the vanes 40. In this disclosed example, the vanes 40 include four columns of vanes that rotate about a vertical axis. The actuator arm 44 is connected to one of the vane columns. A linkage 58 couples all of the vane columns together such that all of the vanes 40 are moved together. The actuator 42 is commanded by a controller 34 of the vehicle to open and close the vanes 40 to provide the desired airflow. It should be appreciated that although a specific vane configuration is shown by way of example, that other vane configurations and orientations could be utilized and are within the contemplation of this disclosure.

The frame 36 includes a forward frame portion 46 nested within an aft frame portion 48. In this example, the aft frame portion 48 is fixed and the forward frame portion 46 is movable.

Figure 4:
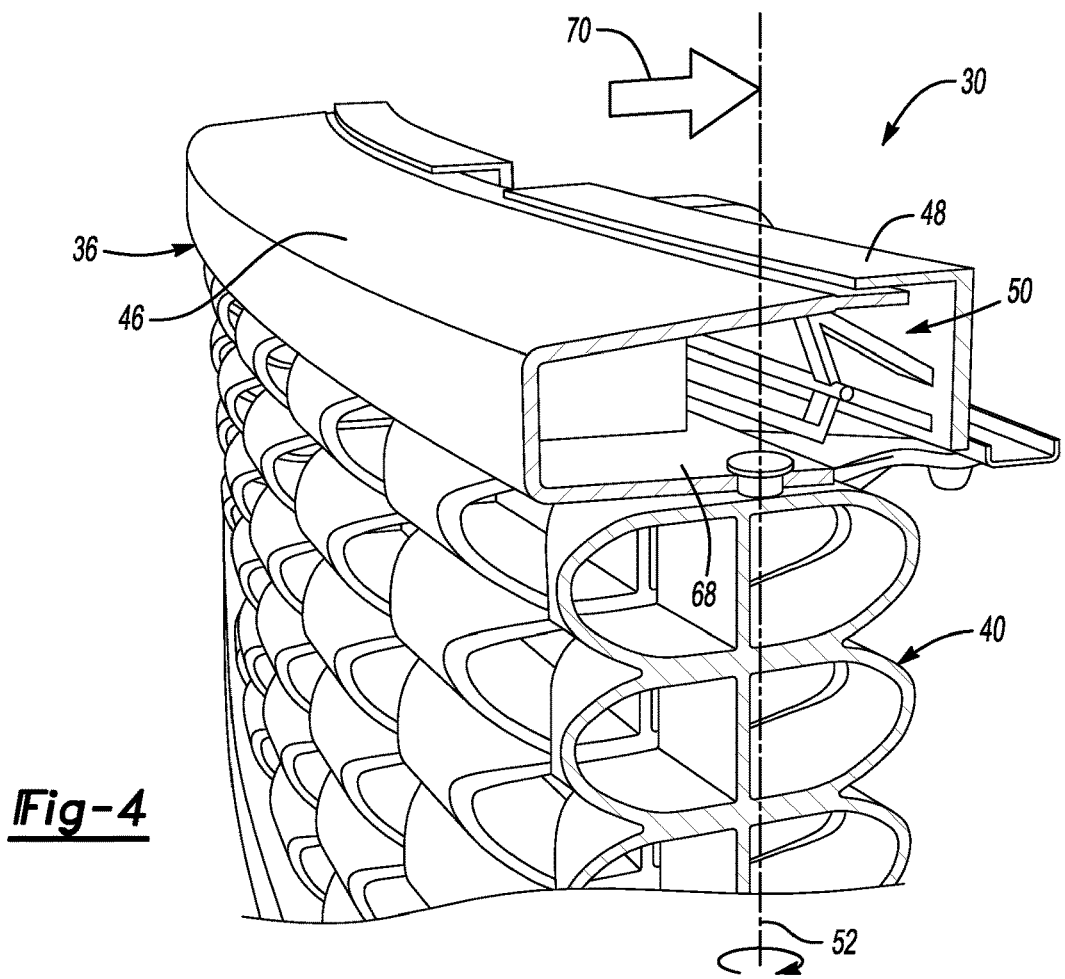
FIG. 4 is a cutaway view of a frame of the example active grille shutter system.

Referring to FIG. 4 with continued reference to FIGS. 2 and 3, The vanes 40 pivot about the pivot axis 52 and are coupled to the forward frame portion 46. The forward frame portion 46 is nested within the aft frame portion 48. A plurality of spring members 50 are disposed within a space defined between the forward frame portion 46 and the aft frame portion 48. The space between the forward frame portion 46 and the aft frame portion 48 defines a crush zone indicated at 68. The springe members 50 are collapsible to absorb impact energy exerted on the forward frame portion 46 in a direction indicated by arrow 70.

The spring members 50 are configured to provide a spring rate predefined to provide controlled movement of the forward frame portion 46 relative to the aft frame portion 48 in response to an impact force. The crush zone 68 is dimensioned o provide a predefined absorption of energy in response to an impact force in a direction indicated by the arrow 70.

Figure 5:
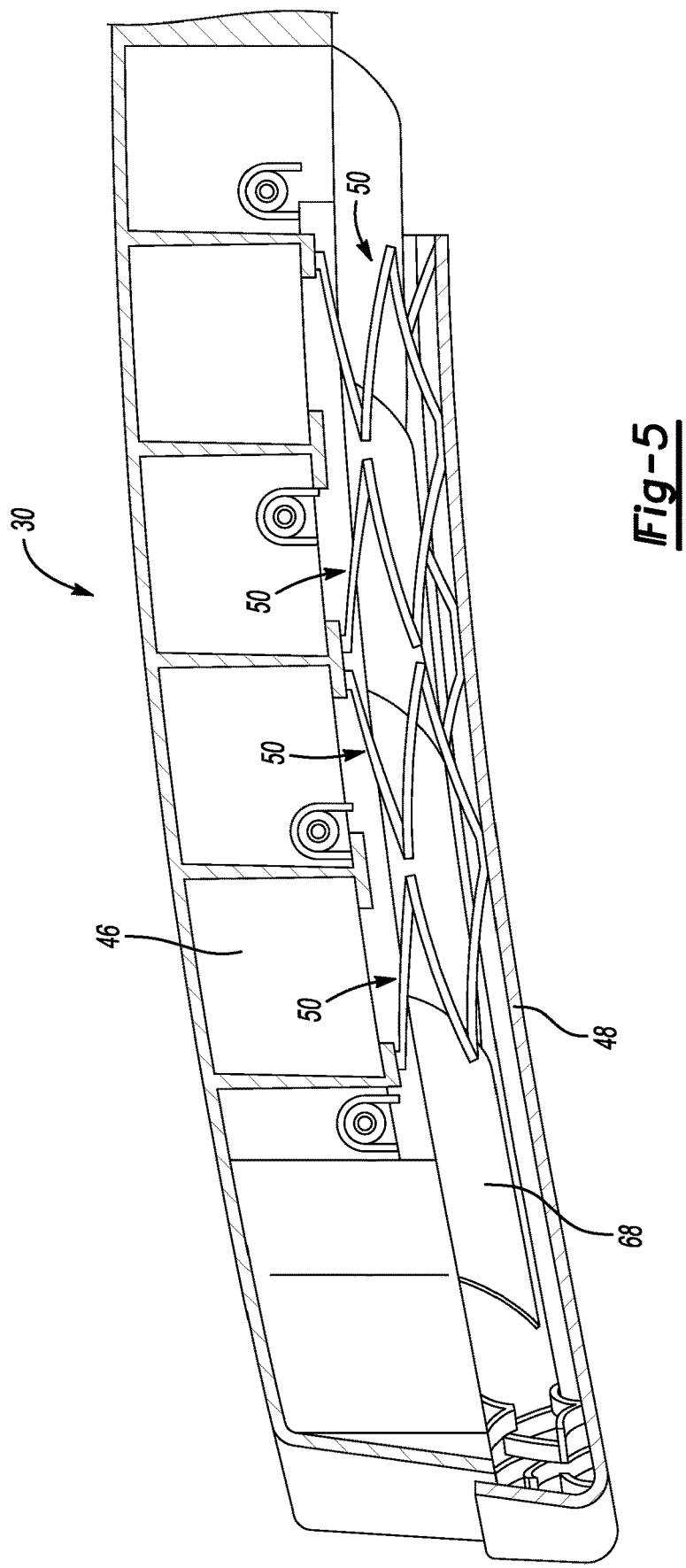
FIG. 5 is a cutaway view looking down at an example frame of the active grille shutter system.

Referring to FIG. 5 with continued reference to FIG. 4, the example spring members 50, forward frame portion 46 and aft frame portion 48 are formed as one single part. The example upper grille assembly 30 is formed utilizing an additive manufacturing process. It should be appreciated that although an additive manufacturing process is disclosed by way of example, other manufacturing processes are also within the contemplation of this disclosure. The additive manufacturing process provides for the forward and aft frame portions 46, 48 and the spring members 50 to be formed as one part without additional assembly.

FIG. 5 shows a top view of the spring members 50 with apportion of the aft frame member 48 removed. The disclosed example spring members 50 are Z-shaped and disposed within the crush zone 68. A force applied against the forward frame portion 46 is absorbed by the spring members 50. The forward spring portion 60 and the aft spring portion 64 are disposed within a common plane and the middle spring portion 62 is spaced apart from the common plane such that the forward spring portion 60 is collapsible against the aft spring portion 64 in a compressed condition. The spring members 50 compress onto themselves as the forward frame portion 46 is forced against the aft frame member 48.

In this disclosed example, for spring members 50 are shown spaced across the crush zone 68 between the forward and aft frame portions 46, 48. It should be appreciated, that the number of spring members 50 may vary to tailor the predefined spring rate and energy absorption. Moreover, spring members 50 are disposed within spacing around the entire perimeter of the grille assembly 30. The crush zone 68 is disposed at each of the sides and the bottom of the frame 36 and includes spring members similar to those shown across the top of the grille assembly in FIG. 5.

Figure 6:
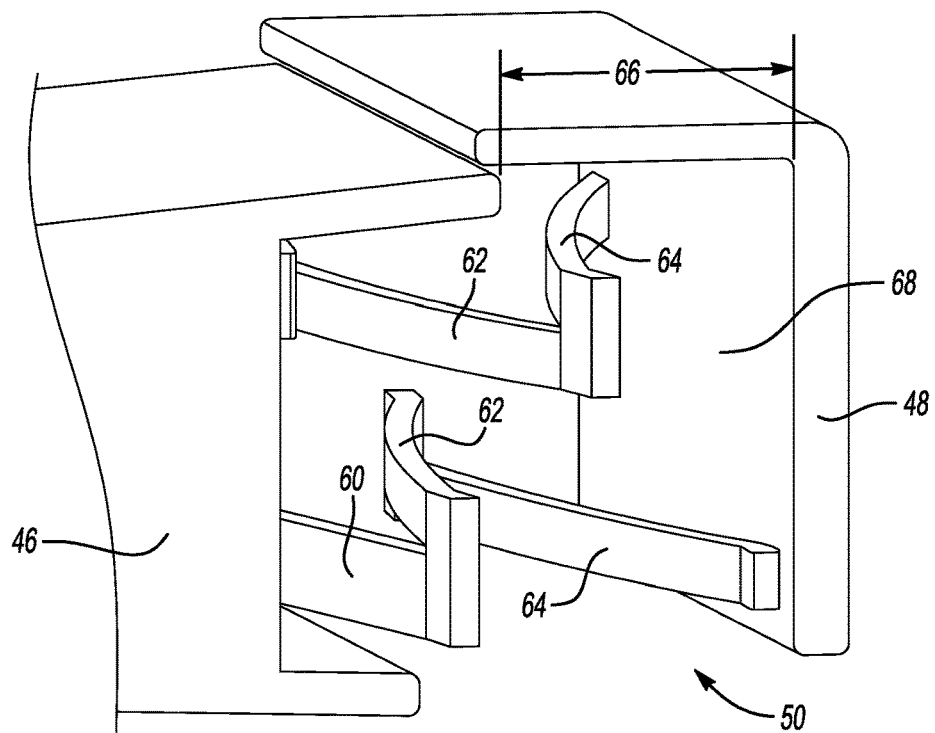
FIG. 6 is a perspective view of an example spring assembly between frame portions.
Figure 7:
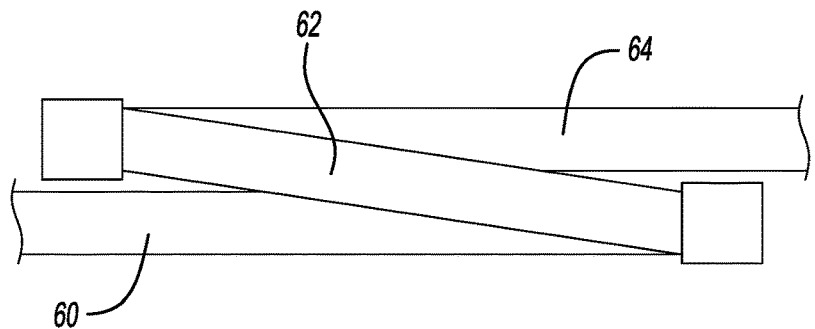
FIG. 7 is a top schematic view of the example spring assembly in a collapsed position.

Referring to FIGS. 6 and 7 with continued reference to FIG. 4, each of the plurality of spring members 50 includes a forward spring portion 60, a mid-spring portion 62 and an aft spring portion 64. The forward spring portion 60 is attached at one end to the forward frame portion 46 and to the mid-spring portion 62 at a second end. The aft spring portion 64 is attached to mid-spring portion 62 at one end and to the aft frame portion 48 at the other end. In the non-compressed condition, the spring members 50 bias the forward frame portion 46 away from the aft frame portion 48 a distance 66. The distance 66 provides for the definition of the crush zone 68 between the forward frame portion 46 and the aft frame portion 48.

In a compressed condition (FIG. 7) the forward spring portion 60 and the aft spring portion 64 compress against each other. The mid-spring portion 62 is disposed above the two compressed forward spring portion 60 and the aft spring portion 64.

Figure 8:
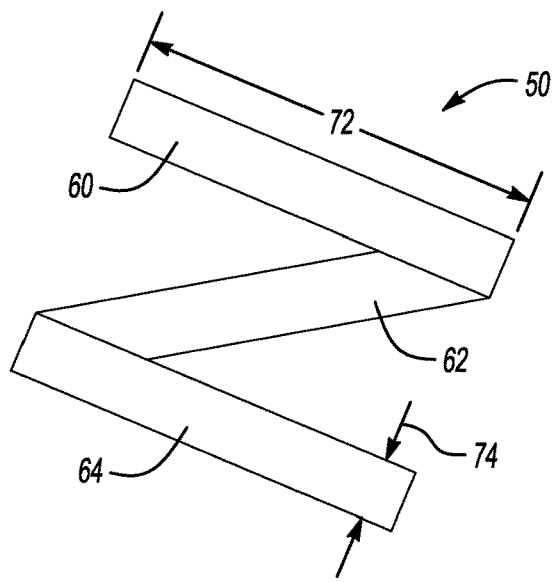
FIG. 8 is a schematic view of an example spring assembly in an expanded position.
Figure 9:
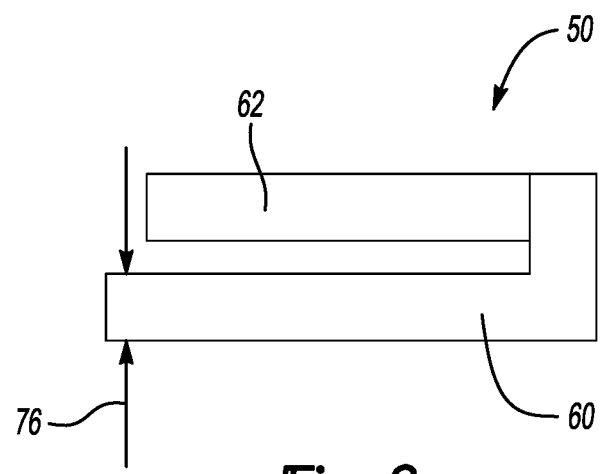
FIG. 9 is a side schematic view of an example spring assembly.

Referring to FIGS. 8 and 9, each of the plurality of spring members 50 are configured to provide a predefined spring rate. The spring rate may be provided by varying a length 72 of each of the spring portions 60, 62 and 64 and/or a thickness 74. In one disclosed embodiment, each of the forward spring portion 60, the middle spring portion 62 and aft spring portion 64 include a common thickness 74 in a direction transverse to the longitudinal length 72.

A height 76 of each spring portion 60, 62, 64 may also be modified to provide the desired predefined spring rate. In one disclosed example, each of the spring portions 60, 62 and 64 are the same with a common length 72, thickness 74 and height 76. In another disclosed example, the length 72, thickness 74 and height 76 are different for at least two of the spring portions 60, 62 and 64. Moreover, in one disclosed example embodiment, each of the spring members 50 are of a common configuration. In yet another disclosed embodiment, the spring members 50 are of varying configurations throughout the grille assembly to tailor impact absorption to specific areas of the front of the vehicle.

Figure 10:
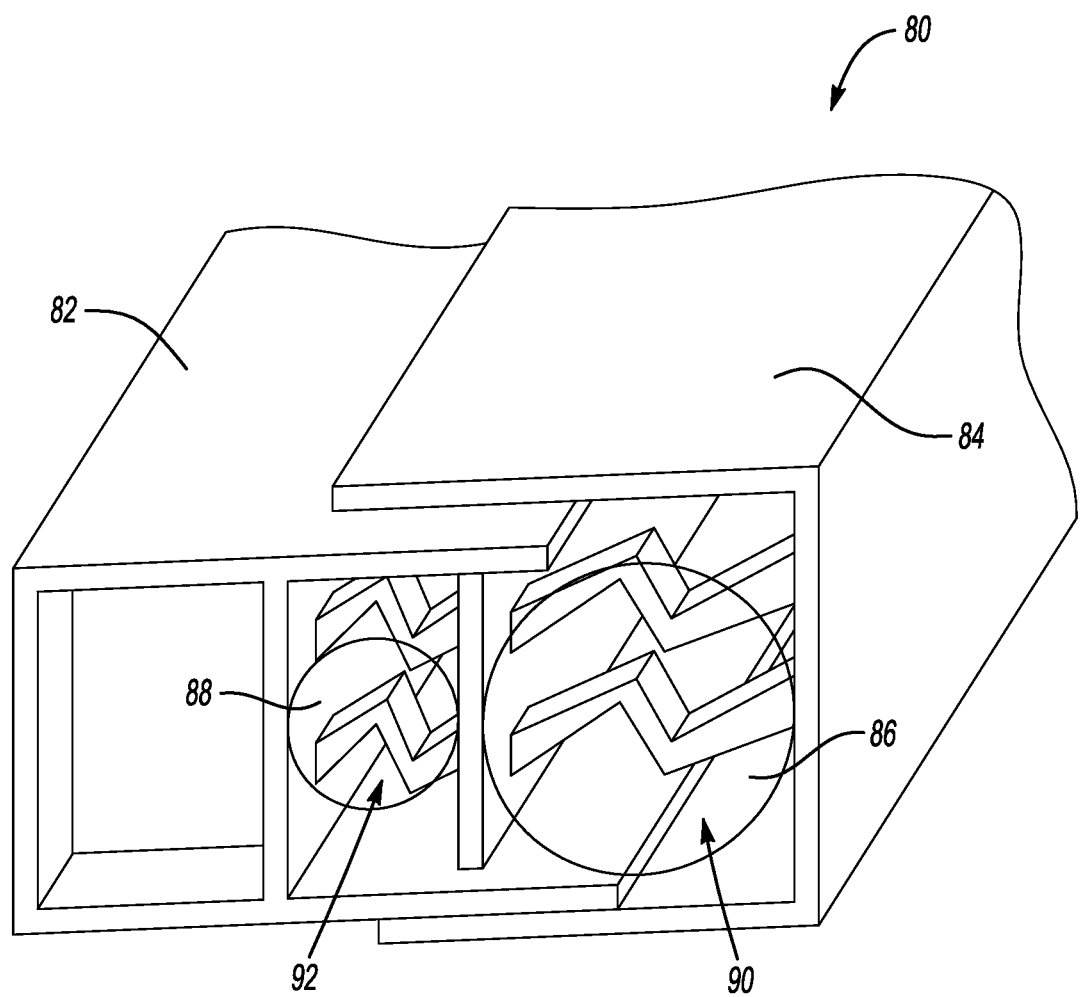
FIG. 10 is a perspective view of another example frame and spring assembly.

Moreover, the spring rate may be defined by the material properties utilized to form each of the spring members. 50. In one disclosed embodiment, a Referring to FIG. 10 another example frame assembly is shown in cross-section and includes a first crush zone 86 and a second crush zone 88. A first frame portion 82 is nested within a second frame portion 84. In this example, the second frame portion 84 is fixed and the first frame portion 82 is moveable into the first frame portion 84 in response to an impact force. A first plurality of spring members 90 are provided in the first crush zone 86 and a second plurality of spring members 92 are provide in the second crush zone 88. The overall spring rate of the first plurality of spring members 90 is different than an overall spring rate provided by the second plurality of spring members 92. The different spring rates provide different impact performance to absorb different levels of impact forces.

In one example, the first plurality of spring members 90 are of lower spring rate than the second plurality of spring members 92. Accordingly, lower impact forces result in compression of the first plurality of spring members 90, but not the second plurality of spring members 92. Higher impact forces first compress the first plurality of spring members 90 and further cause compression of the second plurality of spring members 92 to absorb the higher impact forces.

In one disclosed embodiment, the first and second spring members 90, 92 as well as the first and second frame portions 82, 84 may be formed with an additive manufacturing process.

The disclosed example vehicle grille assemblies include features for absorbing impact energy with spring members disposed between movable frame portions. The spring members absorb energy to provide pedestrian protection at low-speed while maintaining vehicle grille appearance and operability.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A grille assembly for a vehicle comprising:
    a forward frame portion;
    an aft frame portion; and
    a plurality of Z-shaped spring portions coupling the forward frame portion to the aft frame portion such that the forward frame is movable relative to the aft frame, wherein each of the plurality of Z-shaped spring portions include a forward spring portion attached to the forward frame portion, an aft spring portion attached to the aft frame portion and a middle spring portion connecting the forward spring portion to the aft spring portion, the forward spring portion and the aft spring portion are disposed within a common plane and the middle spring portion is spaced apart from the common plane such that the forward spring portion is collapsible against the aft spring portion.

2. The grille assembly for a vehicle as recited in claim 1, including a plurality of vanes supported by at least one of the forward frame portion and the aft frame portion, wherein each of the plurality of vanes is rotatable for controlling airflow.

3. The grille assembly as recited in claim 2, including an actuator coupled to the plurality of vanes with flexible arms movable by the actuator and flexible to provide for movement forward frame portion relative to the aft frame portion.

4. The grille assembly as recited in claim 1, wherein the forward frame portion and the aft frame portion define an outer perimeter and the plurality of vanes are disposed horizontally within the outer perimeter.

5. The grille assembly as recited in claim 1, wherein the forward frame portion and the aft frame portion are nested within each other.

6. The grille assembly as recited in claim 1, wherein the aft frame is fixed relative to the forward frame.

7. The grille assembly as recited in claim 1, wherein each of the forward spring portion, middle spring portion and aft spring portion include a common thickness in a direction transverse to a longitudinal length, the common thickness defining a spring rate of each of the plurality of spring portions.

8. The grille assembly as recited in claim 1, wherein each of the forward spring portion, the middle spring portion and the aft spring portion comprise equal longitudinal lengths.

9. The grille assembly as recited in claim 1, wherein at least two of the forward spring portion, the middle spring portion and the aft spring portion comprise different longitudinal lengths.

10. A front end assembly for a vehicle comprising:
    a bolster assembly;
    an active grille shutter system supported relative to the bolster assembly, the active grille shutter system including a forward frame portion, an aft frame portion, a plurality of Z-shaped spring portions coupling the forward frame portion to the aft frame portion such that the forward frame is movable relative to the aft frame, wherein each of the plurality of Z-shaped spring portions include a forward spring portion attached to the forward frame portion, an aft spring portion attached to the aft frame portion and a middle spring portion connecting the forward spring portion to the aft spring portion, wherein the forward spring portion and the aft spring portion are disposed within a common plane and the middle spring portion is spaced apart from the common plane such that the forward spring portion is collapsible against the aft spring portion, and a plurality of vanes supported by the forward frame portion wherein each of the plurality of vanes is rotatable for controlling airflow.

11. The front end assembly for a vehicle as recited in claim 10, wherein the active grille shutter assembly comprises an upper active grille shutter assembly and a lower active grille shutter assembly.

12. The front end assembly for a vehicle as recited in claim 10, wherein the forward frame portion and the aft frame portion are nested within each other.

13. A method of assembling an active grille shutter system comprising:
   forming a forward grille portion and an aft grille portion coupled together with a plurality of Z-shaped spring portions as a single part,
   forming each of the plurality of Z-shaped spring portions, wherein the Z shaped spring portions include a forward spring portion, an aft spring portion, and a middle spring portion; attaching the forward spring portion to the forward grille portion, attaching the aft spring portion to the aft grille portion, connecting the forward spring portion and the aft spring portion with the middle spring portion, wherein the forward spring portion and the aft spring portion are disposed within a common plane and the middle spring portion is spaced apart from the common plane such that the forward spring portion is collapsible against the aft spring portion;
   forming a plurality of vanes; and
   attaching the plurality of vanes to the forward grille portion such that the forward grill portion and the plurality of vanes are movable relative to the aft grille portion.

14. The method as recited in claim 13, further comprising mounting an actuator to a static structure and attaching flexible arms of the actuator to the plurality of vanes.

15. The method as recited in claim 13, including form the forward grille portion to nest within the aft grille portion in response to application of force on the aft grille portion.

16. The method as recited in claim 15, including forming the plurality of Z-shaped spring portions to provide a predefined spring rate between the forward grille portion and the aft grille portion.

17. The method as recited in claim 16, including forming the plurality of Z-shaped spring portions to nest against each other in a compressed condition, wherein the compressed condition comprises the forward grille portion nested within the aft grille portion.

* * * * *